E. A. STEVENS.
LINE PROTRACTOR.
APPLICATION FILED JULY 24, 1920.

1,368,857.

Patented Feb. 15, 1921.

INVENTOR
E. A. Stevens
ATTORNEY
C. A. Harpman

UNITED STATES PATENT OFFICE.

ERNEST A. STEVENS, OF YOUNGSTOWN, OHIO.

LINE-PROTRACTOR.

1,368,857. Specification of Letters Patent. Patented Feb. 15, 1921.

Application filed July 24, 1920. Serial No. 398,707.

*To all whom it may concern:*

Be it known that I, ERNEST A. STEVENS, a citizen of the United States of America, residing at Youngstown, in the county of Mahoning and State of Ohio, have invented certain new and useful Improvements in Line-Protractors, of which the following is a specification.

This invention relates to improvements in line protractors.

The object of the present invention is to provide a line protractor which is simple of construction, low in the cost of manufacture and easy to operate. In order to do this I have provided two cross arms, one of which carries a protractor and the other a protractor guide and indicator. These two cross arms are secured together by means of a pivot. Located at the four ends of said cross arms are line holders. By securing a base line and one end of a cross operating line, the operator can easily find the angle desired by carrying the loose end around the indicator shows the angle desired.

This device is of especial interest in laying of angles, corners, etc., in building construction. In house building the front or base line can be easily established by finding the set back from the street front. If a corner is desired the same may easily be laid off by securing one end of the cross line ends on a line with the position for the side wall and carrying the other end around until the indicator shows 90° or zero, as shown on my line protractor.

With these and other objects in view, the invention consists in the construction and novel combination of parts hereinafter fully described, illustrated in the accompanying drawings, and pointed out in the claim hereto appended; it being understood that various changes in the form, proportions, size and minor details of construction, within the scope of the claim may be resorted to without departing from the spirit or sacrificing any of the advantages of the invention.

In the drawing Figure 1 is a perspective view of the device.

Figure 1:
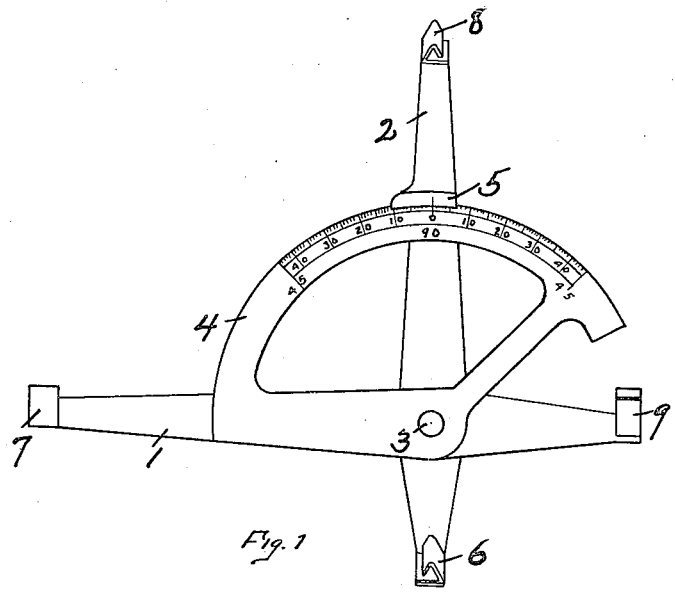
Figure 2:
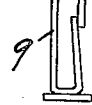
Fig. 2 is a detail view.

By referring to Fig. 1 it will be seen the line protractor consists of two cross arms 1 and 2. These cross arms 1 and 2 are pivoted by means of a rivet 3, or other suitable means. The cross arm 1 has secured thereon a protractor 4 suitably graduated. On the cross arm 2 is secured an indicator and guide 5. The ends of the cross arms 1 and 2 are provided with hooks 6, 7 and 8 and a snap 9.

Figure 3:
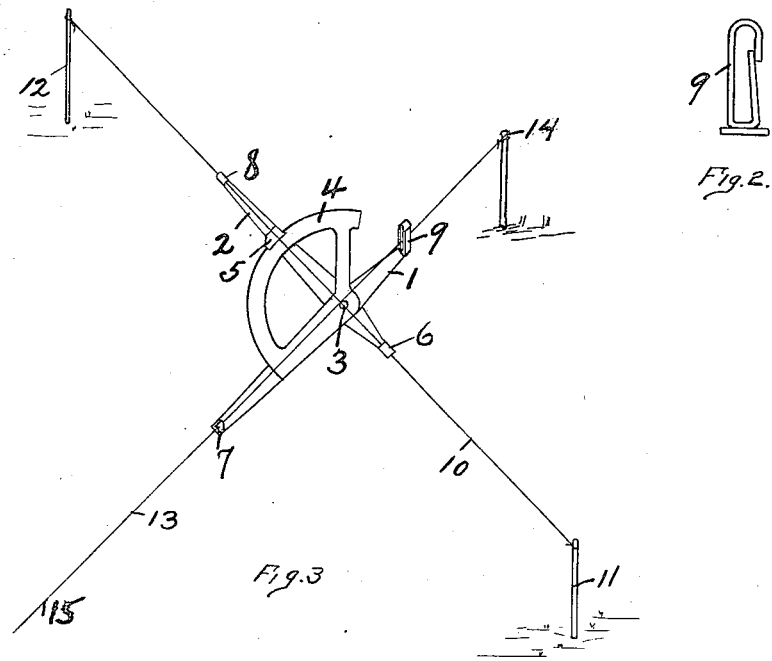
Fig. 3 is a perspective view of the device showing the same attached to base and operating lines.

By referring to Fig. 3 it will be seen that the line protractor is set up for operation, by means of a base line 10 secured to stake 11 and 12. The operating line 13 is secured to stake 14.

In operating this device the operator takes the end 15 of the line 13 and carries it to the right or left until the angle desired is shown by the indicator. It will be seen that in carrying this line to the right or left the entire instrument slides on the line 10 through the hooks 8 and 6.

In order to prevent the device from becoming unhooked from the lines and to give free play of lines, I have used a snap 9 slightly longer than the hooks 6, 7 and 8.

What I claim is:—

In a device of the class described, the combination of two cross arms, a pivot for said cross arms, one arm provided with a protractor, the other arm provided with a guide and indicator, hooks secured at three arm ends, a snap slightly longer than said hooks secured to a fourth arm end, substantially as described.

In testimony whereof I affix my signature.

ERNEST A. STEVENS.

Witnesses:
THOS. H. JENKINS,
C. A. HARPMAN.